(12) United States Patent
Hamamoto et al.

(10) Patent No.: US 7,338,076 B2
(45) Date of Patent: Mar. 4, 2008

(54) ROLL BAR ASSEMBLY AND METHOD FOR MOUNTING THE SAME

(75) Inventors: Katsuhiro Hamamoto, Hiroshima (JP); Seiji Shohara, Higashihiroshima (JP); Masaru Kihara, Higashihiroshima (JP); Naoto Oonishi, Hiroshima (JP)

(73) Assignees: Daikyonishikawa Corporation, Hiroshima (JP); Mazda Motor Corporation, Hiroshima (JP)

( * ) Notice: Subject to any disclaimer, the term of this patent is extended or adjusted under 35 U.S.C. 154(b) by 395 days.

(21) Appl. No.: 11/058,351

(22) Filed: Feb. 16, 2005

(65) Prior Publication Data

US 2005/0212277 A1    Sep. 29, 2005

(30) Foreign Application Priority Data

Mar. 29, 2004  (JP) .............................. 2004-096781

(51) Int. Cl.
*B60R 21/13* (2006.01)
(52) U.S. Cl. ..................................... 280/756
(58) Field of Classification Search ................ 280/756
See application file for complete search history.

(56) References Cited

U.S. PATENT DOCUMENTS 5,893,602 A * 4/1999 Saito ........................ 296/102
6,247,743 B1   6/2001 Bonanno
6,315,326 B1  11/2001 Muller et al.
6,386,585 B1   5/2002 Muller et al.
6,443,517 B1 * 9/2002 Just et al. .............. 296/107.09

FOREIGN PATENT DOCUMENTS

| DE | 29813152 U1 | 11/1998 |
| DE | 10218701 C1 * | 6/2003 |
| EP | 0722859 A1 | 7/1996 |
| JP | 2000-177399 | 6/2000 |
| WO | WO 9746420 A | 12/1997 |
| WO | WO 9829291 A | 7/1998 |

OTHER PUBLICATIONS

European Search Report, EP05003461, Dated Apr. 17, 2007.

* cited by examiner

*Primary Examiner*—Faye M. Fleming
(74) *Attorney, Agent, or Firm*—Donald R. Studebaker; Nixon Peabody, LLP

(57) ABSTRACT

A roll bar assembly for convertibles includes a cross bar to be arranged below a beltline, roll bars connected to the cross bar to protrude upward from the cross bar and a resin-made trim covering the cross bar and the roll bars. Part of the trim covering the cross bar is aligned with the beltline and a plurality of ribs are arranged in space between the said part of the trim and the cross bar in the vehicle width direction.

8 Claims, 10 Drawing Sheets

ROLL BAR ASSEMBLY AND METHOD FOR MOUNTING THE SAME

CROSS-REFERENCE TO RELATED APPLICATION

This non-provisional application claims priority under 35 U.S.C. §119(a) on patent application No. 2004-096781 filed in Japan on Mar. 29, 2004, the entire contents of which are hereby incorporated by reference.

BACKGROUND OF THE INVENTION (a) Field of the Invention

The present invention relates to a roll bar assembly used for convertibles and a method for mounting the assembly.

(b) Description of Related Art

In general, convertibles have lower stiffness than sedans because of their structures. Therefore, to give the stiffness, for example, Japanese Unexamined Patent Publication No. 2000-177399 discloses a technique of providing a cross bar and roll bars protruding upward from the cross bar in a cabin behind seats. There is also a known technique of covering these components with a resin-made trim for the purpose of improved decoration and safety.

In some cases, the cross bar is positioned below a beltline of the convertible. In such cases, if the top face of the trim is aligned with the beltline for aesthetic purposes, a large cavity is formed between the cross bar and the top face of the trim. Accordingly, the function of head impact protection is not fully exerted by the trim covering the cross bar.

Further, since components such as a roof member are installed behind the cross bar and the roll bars, space for mounting the trim is not large enough. Therefore, it takes much effort to mount the trim on the cross bar and the roll bars.

SUMMARY OF THE INVENTION

The present invention has been achieved in view of the above problems. An object of the present invention is to provide a roll bar assembly which is capable of exerting the function of head impact protection and easy to mount on a vehicle body, as well as a method for mounting the same.

To achieve the above object, a trim of the present invention is formed integrally with a plurality of ribs protruding downward in the inside of the trim.

More specifically, a first invention relates to a roll bar assembly for convertibles.

The roll bar assembly comprises: a cross bar which is arranged below a beltline; roll bars which are connected to the cross bar to extend upward from the cross bar; and a resin-made trim which covers the cross bar and the roll bars, wherein part of the trim covering the cross bar is aligned with the beltline and a plurality of ribs are arranged in space between the said part of the trim and the cross bar in the vehicle width direction.

According to a second invention, the ribs are formed integrally with the trim to protrude downward.

According to a third invention, lower ends of the ribs are supported on an upper part of the cross bar.

With this configuration, the ribs formed inside the resin-made trim abut on an upper part of the cross bar, thereby ensuring the strength of the trim even if there is a large cavity between the cross bar and the top face of the trim. Accordingly, the trim is allowed to exert the function of head impact protection. Further, since the ribs facilitate the positioning of the trim in the vertical direction, the trim is mounted precisely on the cross bar and the roll bars. Thus, a roll bar assembly which is capable of exerting the function of head impact protection and easy to mount on a vehicle body is obtained.

According to a fourth invention, the trim includes a front trim arranged at the front of the cross bar and a rear trim arranged behind the cross bar, wherein lower ends of the ribs formed integrally with at least one of the front trim and the rear trim are supported on an upper part of the cross bar and the front trim and the rear trim are engaged to each other.

According to a fifth invention, the rear trim is supported on a rear part of the cross bar.

With this configuration, the trim is divided into the front and rear trims to sandwich the cross bar and the roll bars from the front and the back. Therefore, the trim is mounted on the cross bar and the roll bars with greater ease. Further, the trim is firmly fixed to the cross bar and the roll bars with the inside configuration thereof and the lower ends of the ribs formed integrally with one or both of the front trim and the rear trim are engaged to the upper part of the cross bar. Thus, the trim improves significantly in rigidity.

According to a sixth invention, the cross bar is in the shape of a substantially rectangular frame when viewed in cross section.

With this configuration, the front trim, rear trim and ribs are mounted on flat faces of the cross bar. Therefore, mounting holes and the like are formed more easily than in the case where the cross bar is shaped like a round pipe, whereby the front trim, rear trim and ribs are mounted more firmly to the cross bar.

According to a seventh invention, the front trim of the roll bar assembly further includes a pair of extended portions which are located at both sides of a center tunnel bulging in the middle of a front floor portion in the vehicle width direction and extend toward the front floor portion, the extended portions being supported by a kick-up portion located behind the front floor portion to extend upward therefrom.

With this configuration, the front trim is engaged also to the kick-up portion, to increase in rigidity. Further, since the front trim extends toward the front floor portion, the kick-up portion can be covered without extending a floor carpet on the front floor portion upward from the front floor portion. Thus, the floor carpet is placed more easily.

An eighth invention relates to a method for mounting a roll bar assembly for convertibles.

The method comprises the steps of: preparing a cross bar to which roll bars are connected to protrude upward from the cross bar, a front trim to be arranged at the front of the cross bar and a rear trim to be arranged behind the cross bar and engaged to a rear part of the cross bar; arranging the rear trim to be supported on an upper part of the cross bar; fastening the cross bar supporting the rear trim to a vehicle body; and engaging the front trim to a front part of the cross bar and the rear trim.

With this configuration, the rear trim is mounted on the cross bar and the roll bars in advance on a sub line, and then the cross bar and the roll bars are fixed to the vehicle body. Therefore, even if space behind the roll bar assembly is not large enough, the roll bar assembly is mounted easily, thereby improving production efficiency to a great extent. Further, the ribs of the rear trim allow easy positioning of the trim, whereby the trim is mounted to the cross bar and the roll bars with accuracy and the rigidity of the mounted trim improves.

According to a ninth invention, there is provided a roll bar assembly for convertibles comprising: a cross bar which is arranged below a beltline and has a cross section in the shape of a substantially rectangular frame; roll bars which are connected to the cross bar to protrude upward from the cross bar; a front trim which is arranged at the front of the cross bar; and a rear trim which is arranged behind the cross bar to be supported on a rear part of the cross bar, wherein the front trim and the rear trim are engaged to each other, part of the rear trim covering the cross bar is aligned with a beltline, a plurality of ribs are arranged in space between the said part of the rear trim and the cross bar in the vehicle width direction, the ribs protruding downward to be supported on an upper part of the cross bar, and the front trim further includes a pair of extended portions which are located at both sides of a center tunnel bulging in the middle of a front floor portion in the vehicle width direction and extend toward the front floor portion, the extended portions being supported by a kick-up portion located behind the front floor portion to extend upward therefrom.

DETAILED DESCRIPTION OF THE INVENTION

Hereinafter, an explanation is given of an embodiment of the present invention with reference to the drawings. The following embodiment is an inherently preferable example and does not limit the present invention, subjects to which the present invention is applied and the applicable scope of the present invention.

Figure 1:
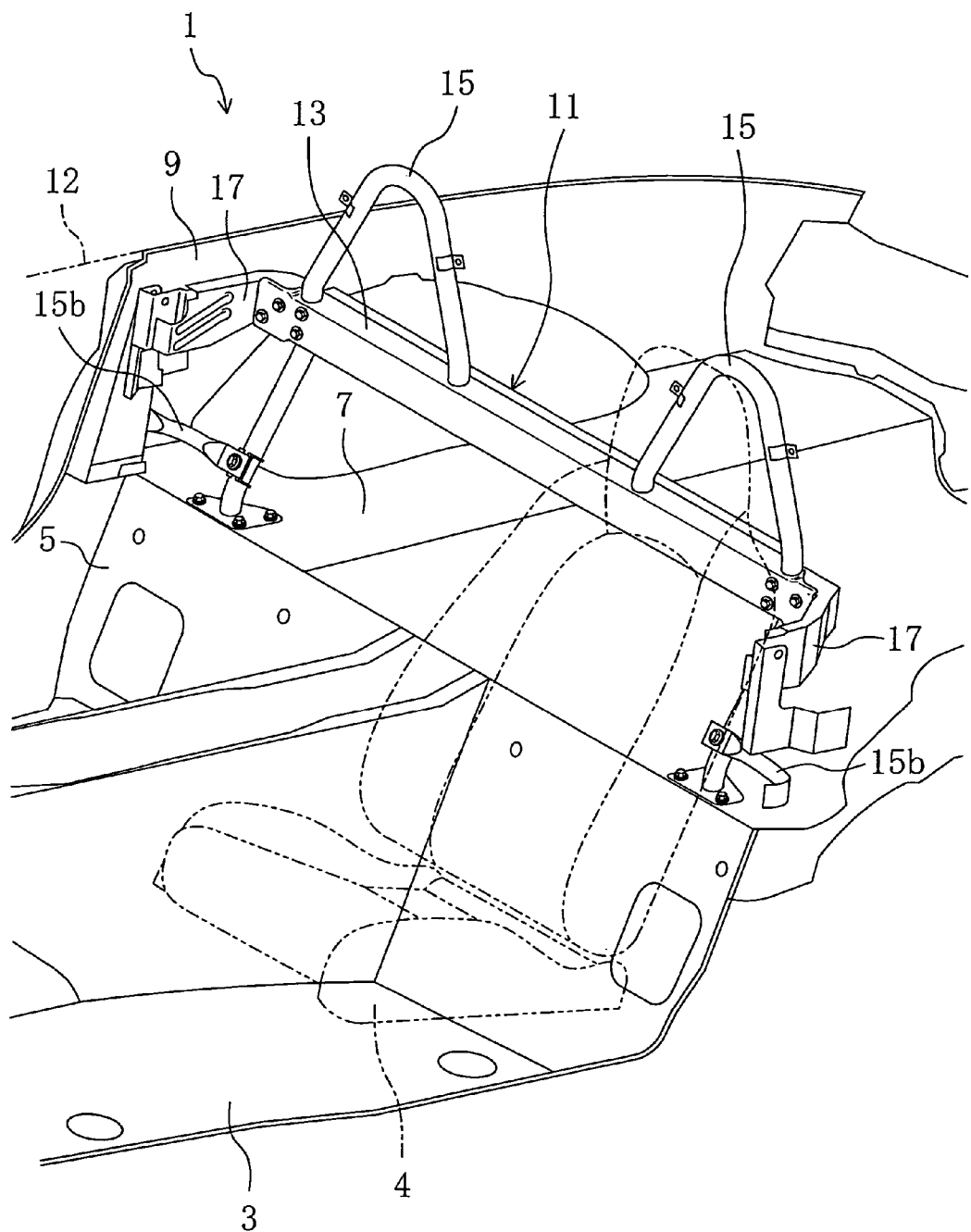
FIG. 1 is an oblique view illustrating a behind-seat part of a bodywork frame of a convertible.

FIG. 1 shows a part of a bodywork frame 1 of a convertible behind a seat 4 (indicated with a chain double-dashed line in FIG. 1). The bodywork frame 1 includes a front floor portion 3, a kick-up portion 5 extending upward from the front floor portion 3 with rearward inclination, a rear floor portion 7 extending behind the kick-up portion 5 and right and left side panels 9 in the vehicle width direction. In FIG. 1, the left side panel 9 is omitted.

Figure 2:
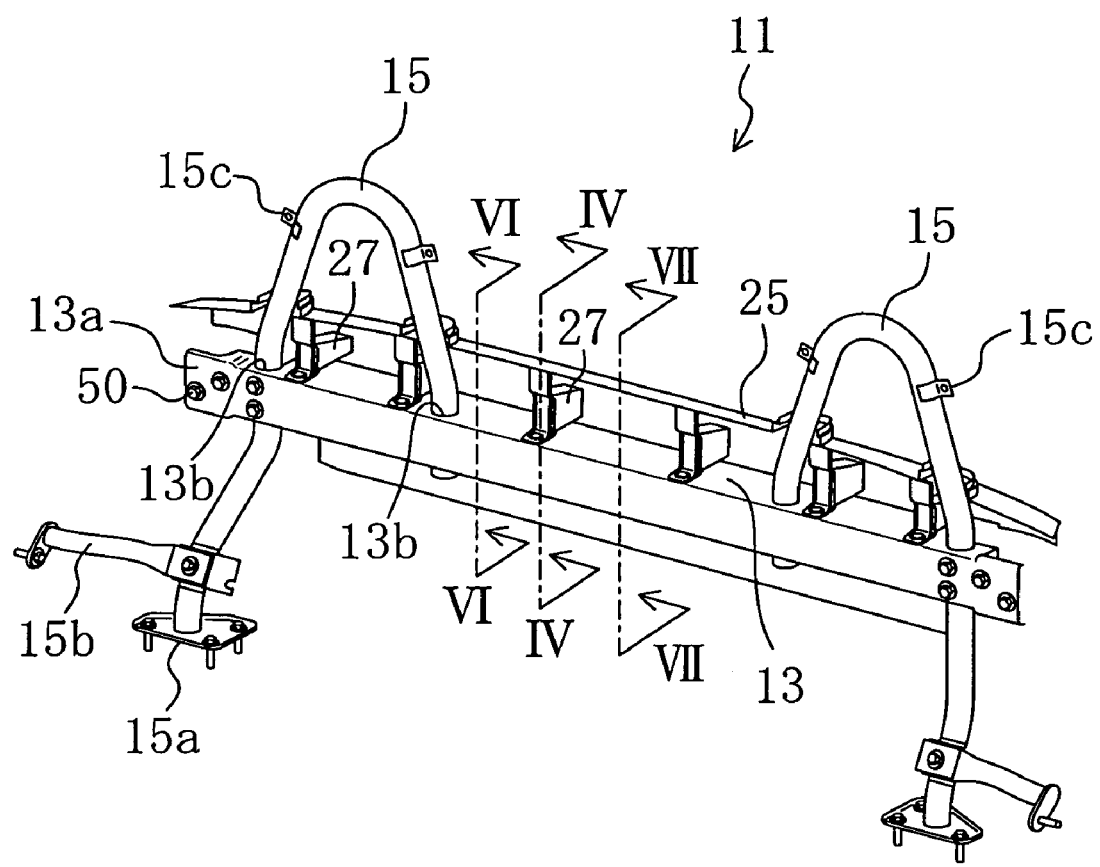
FIG. 2 is an exploded oblique view illustrating a major part of a roll bar assembly according to an embodiment of the present invention.

As shown in FIG. 2, a roll bar assembly 11 of the present embodiment is arranged to connect the right and left side panels 9. The roll bar assembly 11 includes a cross bar 13 arranged below a beltline 12 of the convertible and two substantially inverted U-shaped roll bars 15 arranged to protrude upward from the cross bar 13.

Figure 3:
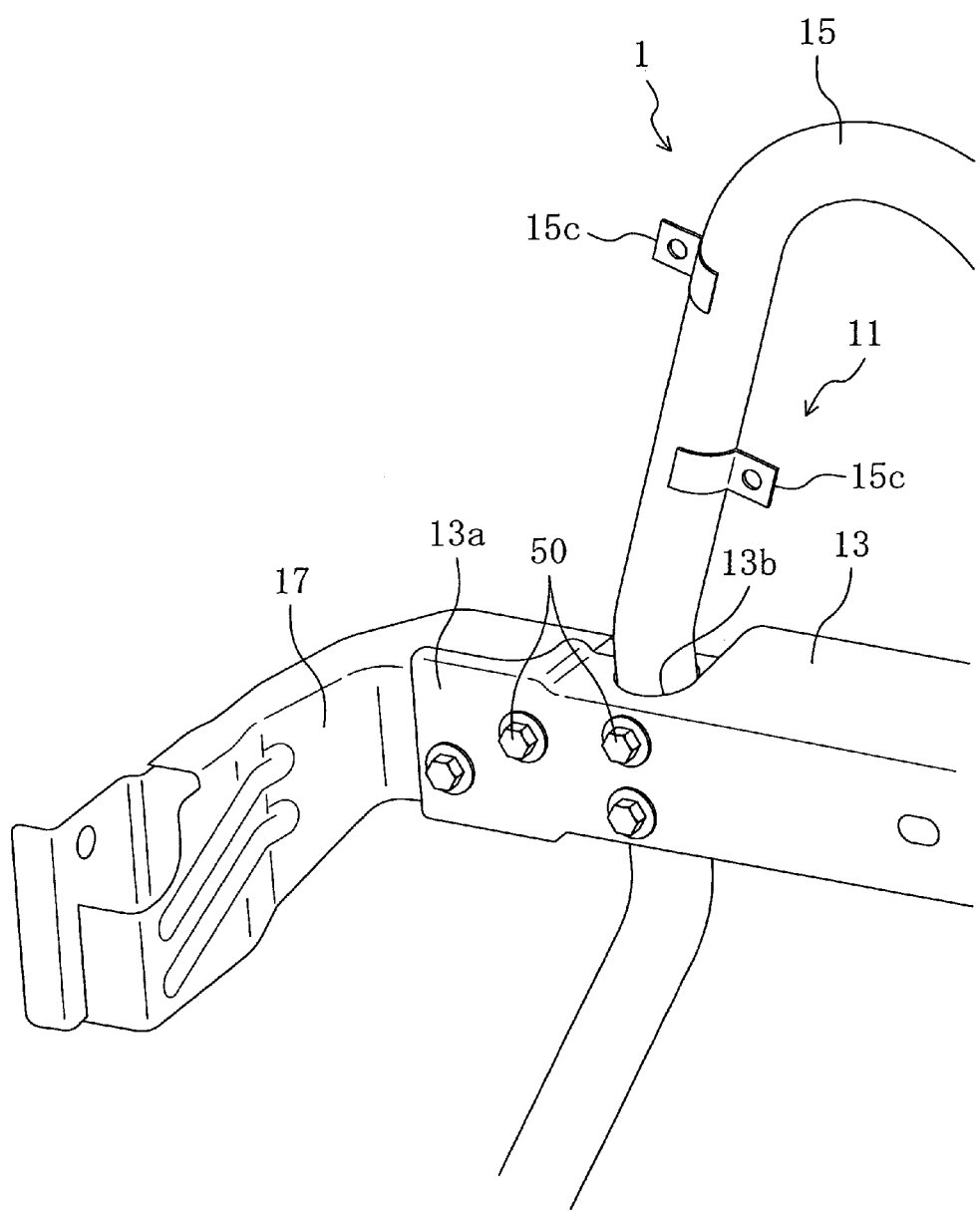
FIG. 3 is an enlarged oblique view illustrating the vicinity of a cross bar mounting part of a cross bar.

As shown in FIG. 3, the cross bar 13 extends in the vehicle width direction behind the seat 4 and its both ends are connected to cross bar mounting parts 17 provided on the side panels 9 behind the right and left side doors, respectively. The cross bar mounting parts 17 are substantially L-shaped when viewed in plan.

Figure 4:
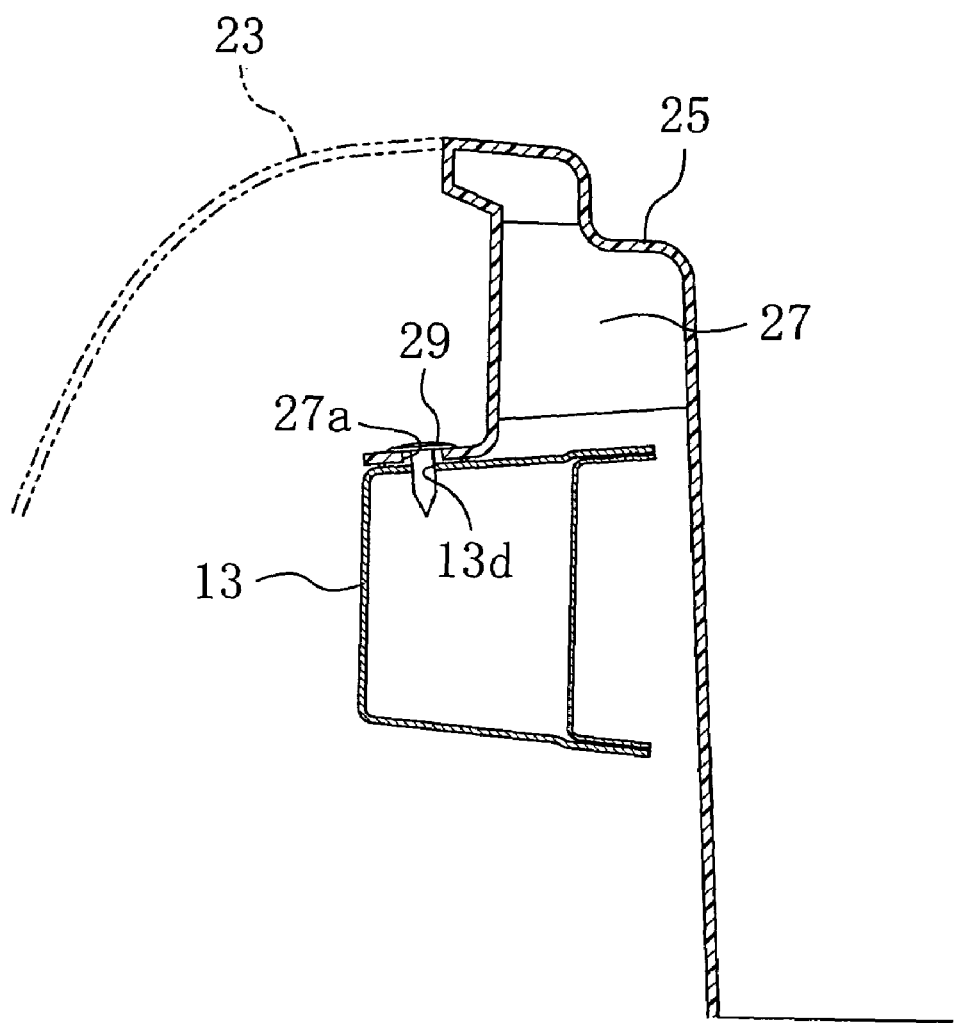
FIG. 4 is a cross section cut along the line IV-IV indicated in FIG. 2.

As shown in FIG. 4, the cross bar 13 is made of two C-shaped channel members of different depths which are combined in the shape of a substantially rectangular pipe (a substantially rectangular frame). An opening of one of the C-shaped channel members having a smaller depth is faced rearward so that the bottom surface thereof serves as the rear wall of the cross bar. Referring to FIG. 3, mounting brackets 13a welded to both ends of the cross bar 13 are provided with two bolt inserting holes (not shown), respectively. The cross bar 13 is fixed to the side panels 9 by fastening the mounting brackets 13a to the cross bar mounting parts 17 with bolts 50 inserted in the bolt insertion holes.

As shown in FIG. 2, each of the roll bars 15 is formed by bending a round steel pipe in a laterally symmetric, substantially inverted-U configuration. An end of each of the roll bars 15 closer to the side panels 9 extends to a lower position than the other end. In the cross bar 13, roll bar insertion holes 13b whose diameter is slightly larger than the outside diameter of the roll bars 15 are opened to penetrate the upper and lower walls of the cross bar 13. Further, two bolt insertion holes (not shown) are formed in parts of the front wall of the cross bar 13 corresponding to the roll bar insertion holes 13 closer to the side panels 9, respectively. That is, the roll bars 15 are inserted in the roll bar insertion holes 13b formed in the cross bar 13 and fastened to the cross bar 13 with bolts 50 inserted in the bolt insertion holes.

A substantially triangular mounting bracket 15a is welded to each of the lower ends of the roll bars 15 closer to the side panels 9. The mounting brackets 15a are fastened to a rear floor portion 7 behind the seat 4 with bolts 50. Further, mounting pipes 15b are welded to the roll bars 15 at positions above the mounting brackets 15a to extend outward in the vehicle width direction. The mounting pipes 15b are fastened to the side panels 9 behind the side doors with bolts 50, respectively. Thus, the cross bar 13 and the roll bars 15 are firmly fixed to the bodywork frame 1 to give stiffness to the convertible. The roll bars 15 are provided with clips 15c to which garnishes 31 described later will be fixed.

Figure 5:
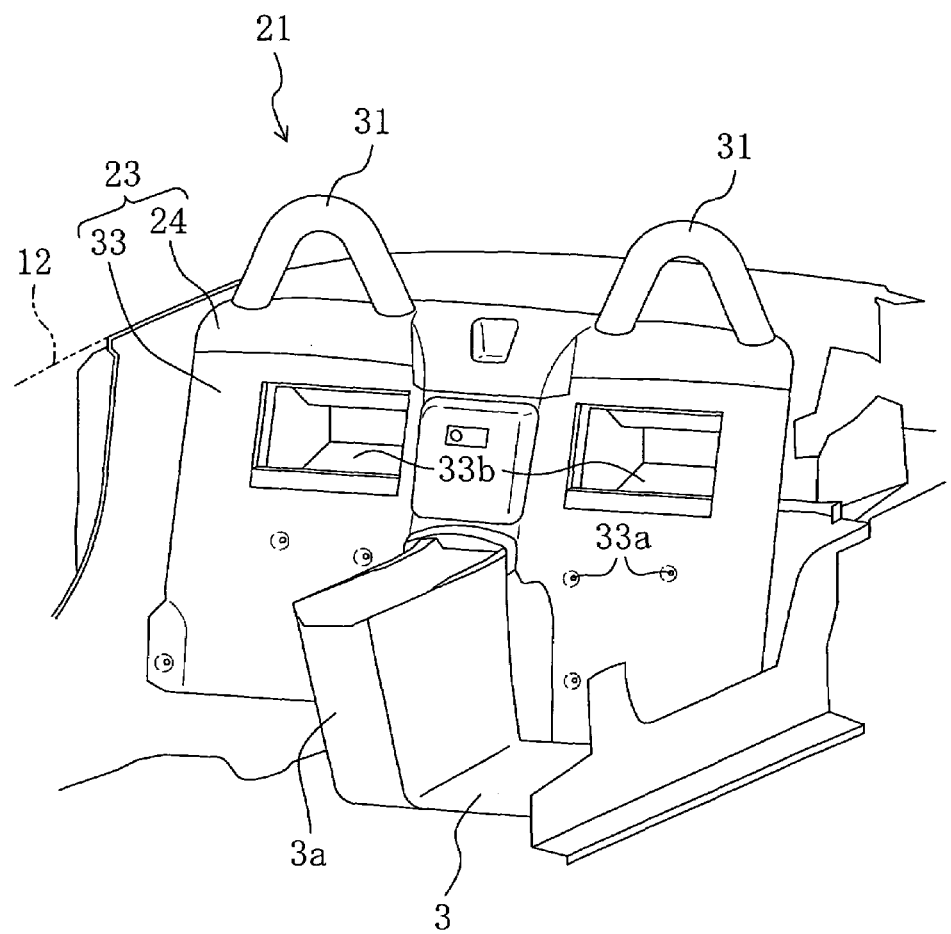
FIG. 5 is an oblique view illustrating the behind-seat part of the bodywork frame on which the roll bar assembly has been mounted.

Referring to FIG. 5, the cross bar 13 and the roll bars 15 are almost entirely covered with a resin-made trim 21. More specifically, the trim 21 includes a front trim 23 arranged at the front of the cross bar 13 to be engaged to the front wall of the cross bar 13, a rear trim 25 (shown in FIG. 2) arranged behind the cross bar 13 to be engaged to the rear wall of the cross bar 13 and garnishes 31 in a substantially inverted-U configuration corresponding to the shape of the roll bars 15. The top face of the trim 21 covering the cross bar 13 is aligned with the beltline 12.

Figure 6:
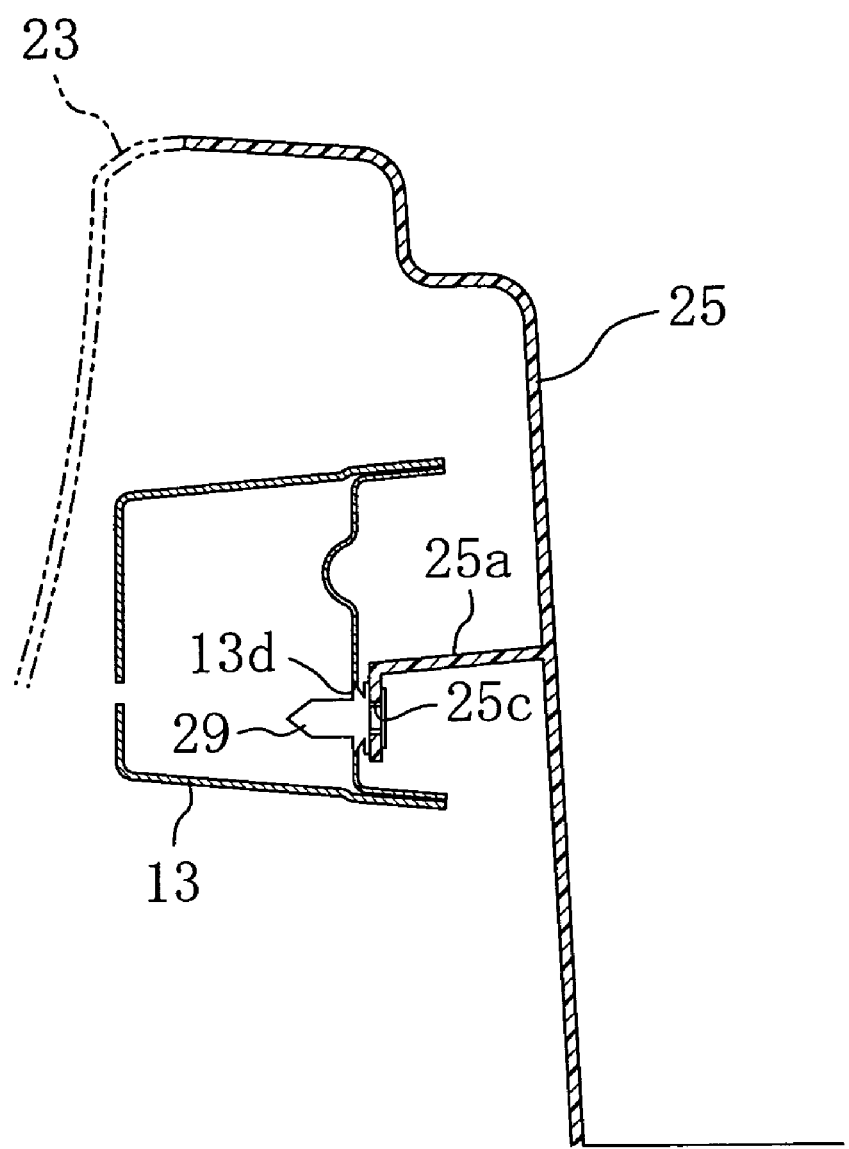
FIG. 6 is a cross section cut along the line VI-VI indicated in FIG. 2.
Figure 7:
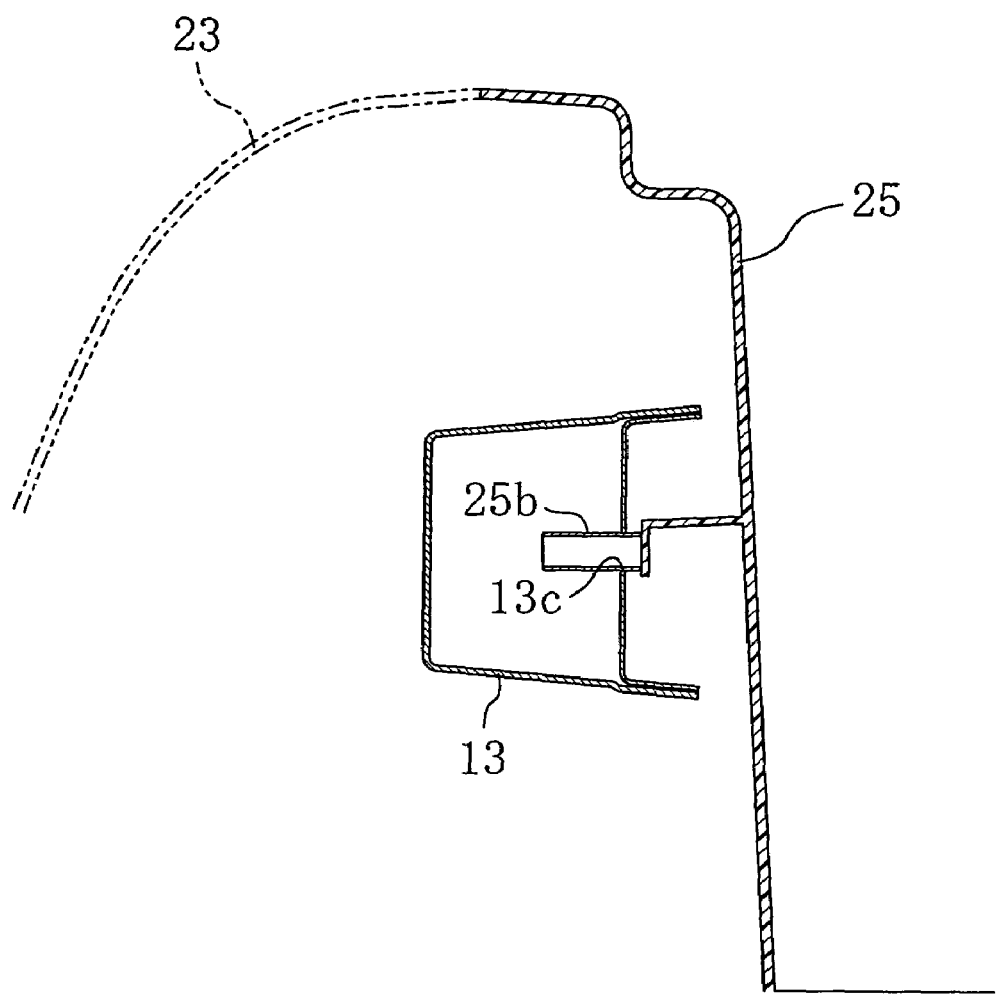
FIG. 7 is a cross section cut along the line VII-VII indicated in FIG. 2.

As shown in FIGS. 6 and 7, a plurality (4 in this embodiment) of forward-extending engagement parts 25a having an L-shaped profile and a positioning pin 25b are arranged on the inside wall of the rear trim 25 at certain intervals in the vehicle width direction. The engagement parts 25a and the positioning pins 25b are molded integrally with the rear trim 25. Further, as shown in FIG. 2, a plurality (6 in this embodiment) of downward-extending ribs 27 are formed on the inside wall of the rear trim 25 at substantially regular intervals in the vehicle width direction. The ribs 27 are also molded integrally with the rear trim 25. The ribs 27 may be formed on an upper front trim 24 to be described later or both of the upper front trim 24 and the rear trim 25.

The positioning pin 25b formed on the inside wall of the rear trim 25 is inserted in a positioning through hole 13c formed in the rear wall of the cross bar 13, thereby positioning the rear trim 25 relative to the cross bar 13. Further, fasteners 29 are inserted into fastener through holes 25c formed in the front ends of the engagement parts of the rear trim 25 and through holes 13d formed in the rear wall of the cross bar 13, thereby fastening the engagement parts of the rear trim 25 to the rear wall of the cross bar 13. Further, as shown in FIG. 4, fasteners 29 are inserted into fastener through holes 27a formed in the lower ends of the ribs 27 of the rear trim 25 and through holes 13d formed in the upper wall of the cross bar 13, thereby fastening the ribs 27 of the rear trim 25 to the upper wall of the cross bar 13. In this way, the rear trim 25 is firmly fixed to the cross bar 13. With the adjustment of the configuration of the ribs 27 of the rear trim 25 (e.g., an increase or decrease of the number of the ribs), the trim 21 surely exerts the function of head impact protection.

Figure 11:
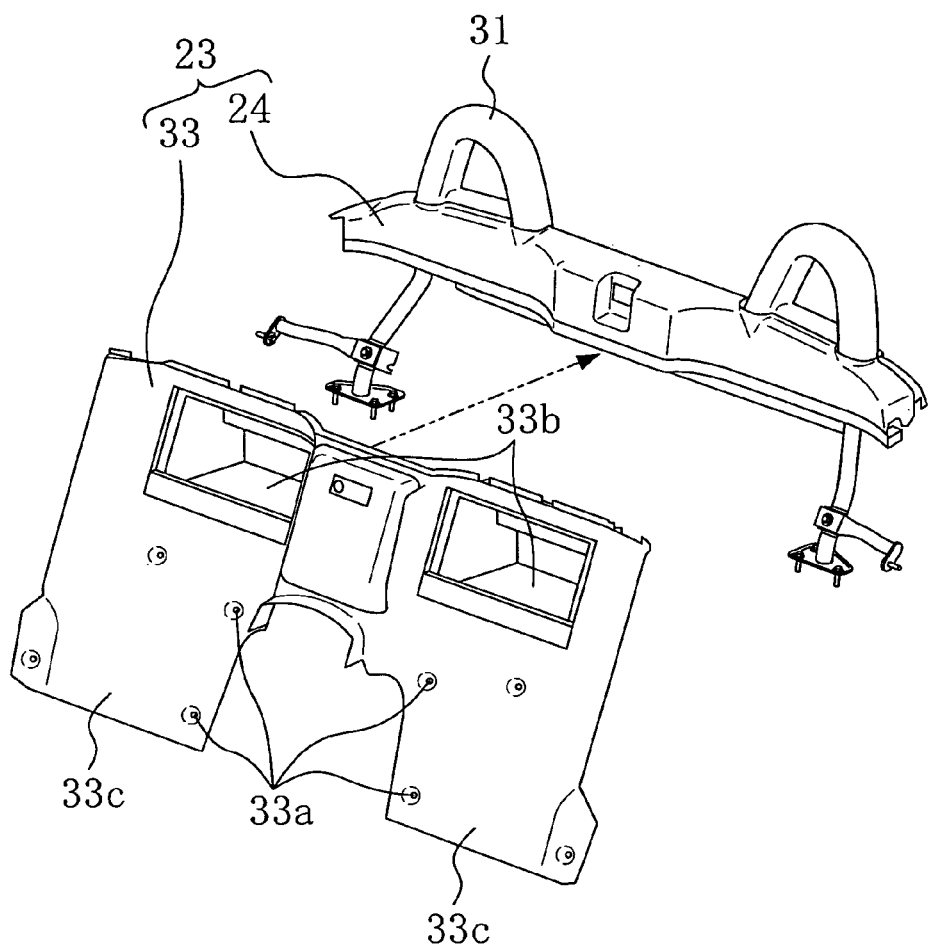
FIG. 11 is an exploded oblique view illustrating how to attach a lower trim to an upper front trim.

Referring to FIGS. 5 and 11, the shape of the front trim 23 corresponds to that of the rear trim 25. The front trim 23 includes an upper front trim 24 covering the cross bar 13 and a lower trim 33 extending toward a front floor portion 3 from the lower end of the upper front trim 24. For example, though not shown in detail, the upper front trim 24 may be molded integrally with a plurality of rearward-extending engagement parts having an L-shaped profile and a positioning pin which are arranged at certain intervals in the vehicle width direction. In this case, the positioning pin formed on the inside wall of the upper front trim 24 is inserted in a positioning through hole formed in the front wall of the cross bar 13 to position the upper front trim 24 relative to the cross bar 13. Then, projections formed at the rear ends of the engagement parts of the upper front trim 24 are inserted in through holes formed in the front wall of the cross bar 13 to fix the engagement parts of the upper front trim 24 to the front wall of the cross bar 13. The upper front trim 24 may be molded without the engagement parts and the positioning pin.

The upper front trim 24 and the rear trim 25 are engaged to each other by engaging engagement lugs (not shown) provided at the upper ends of the upper front trim 24 and the rear trim 25, respectively.

Figure 8:
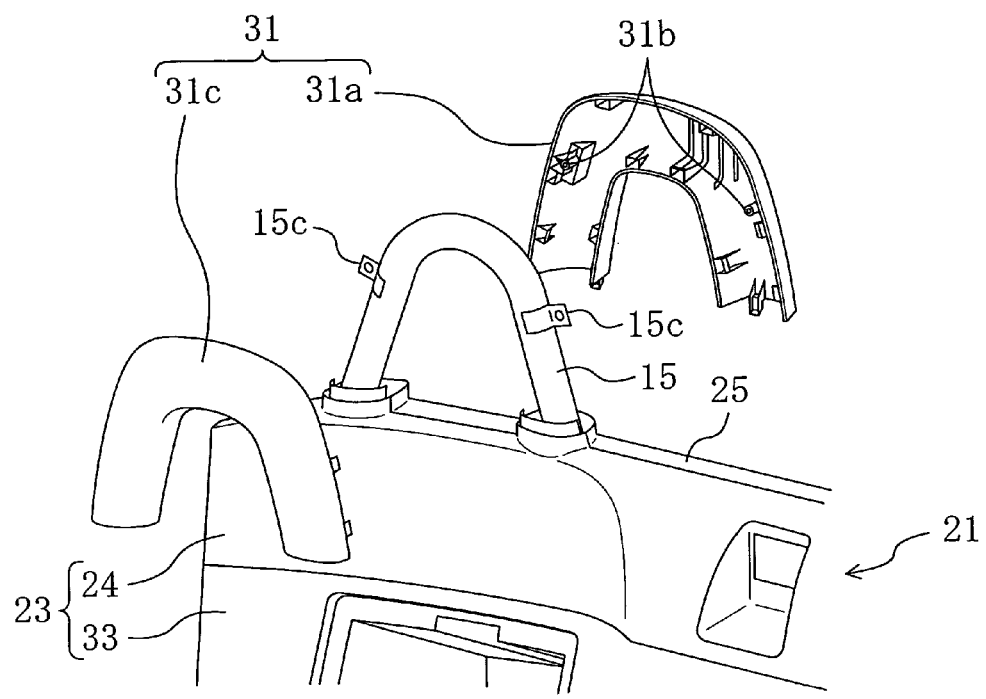
FIG. 8 is an exploded oblique view illustrating how to cover the roll bar with a garnish of a trim.

As shown in FIG. 8, the roll bar 15 protruding from the trim 21 is covered with a garnish 31 of the trim 21. The garnish 31 is divided into a front garnish 31c and a rear garnish 31a. The rear garnish 31a is provided with threaded bosses 31b for fastening the clips 15c of the roll bar 15 to the rear garnish 31a with screws (not shown). The rear garnish 31a covers the roll bar 15 from behind and is fixed to the roll bar 15 by fastening the clips 15c to the threaded bosses with screws. The front and rear garnishes 31c and 31a are engaged to each other via engagement lugs (not shown) arranged at the peripheries of the front and rear garnishes 31c and 31a, respectively, thereby fixing the garnish 31 to the roll bar 15. In this case, the front and rear garnishes 31c and 31a are fixed only to the roll bar 15 but not to the trim 21. This allows easy mounting of the garnish 31 even if there is a dimensional deviation between the garnish 31 and the trim 21.

As shown in FIG. 5, the lower trim 33 of the front trim 23 includes a plurality of fastener insertion holes 33a and a lower part partially cut away to straddle a center tunnel 3a protruding from the front floor portion 3 and extending in the vehicle length direction. In other words, the lower trim 33 includes extended portions 33c which are located at both sides of the center tunnel 3a bulging in the middle of the front floor portion 3 in the vehicle width direction and extend toward the front floor portion 3 along the kick-up portion 5. In a center part of the lower trim 33 opposed to the rear surfaces of the right and left seats 4, luggage containers 33b extending rearward in the vehicle length direction are formed. The lower trim 33 is fixed to the kick-up portion 5 by fitting fasteners 29 in the fastener insertion holes 33a.

Method for Mounting Roll Bar Assembly

An explanation is given of a method for mounting a roll bar assembly 11 according to the present embodiment.

First, the roll bar assembly 11 is mounted on a sub line. The roll bars 15 are attached to the cross bar 13, and then the mounting pipes 15b are attached to the roll bars 15, respectively.

Figure 9:
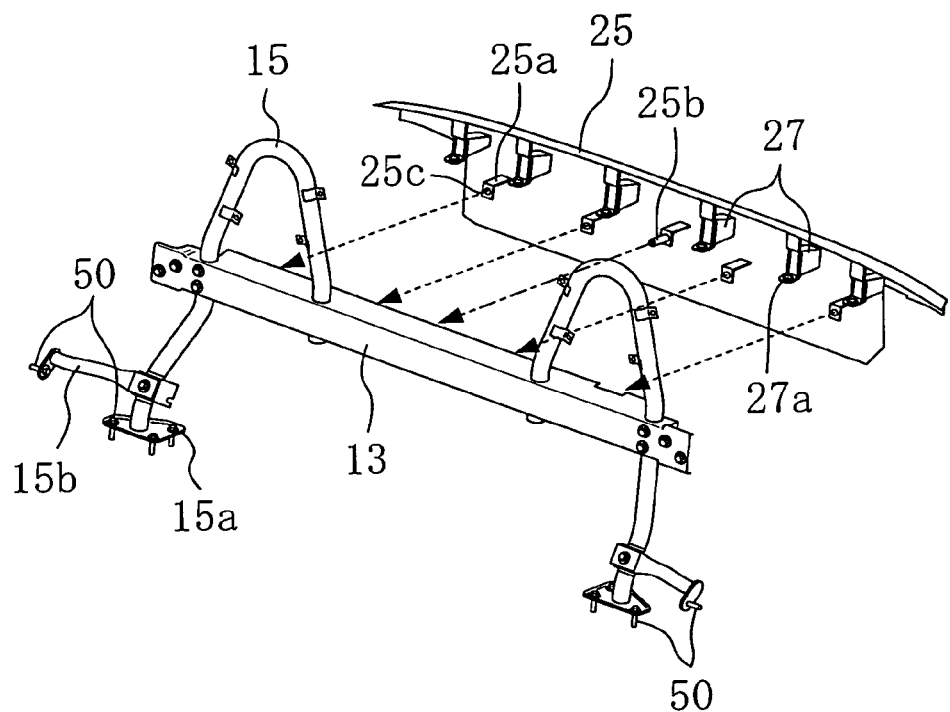
FIG. 9 is an exploded oblique view illustrating how to mount a rear trim on the cross bar.

As shown in FIG. 9, the positioning pin 25b formed on the inside wall of the rear trim 25 is inserted in the positioning through hole 13c formed in the rear wall of the cross bar 13, thereby positioning the rear trim 25.

Then, the fasteners 29 are inserted into the fastener through holes 25c provided in the forward ends of the engagement parts 25a of the rear trim 25 and the insertion holes 13d formed in the rear wall of the cross bar 13 to fasten the engagement parts 25a to the rear wall of the cross bar 13. Simultaneously, fasteners 29 are inserted into the fastener through holes 27a formed in the lower ends of the ribs 27 of the rear trim 25 and the through holes formed in the upper wall of the cross bar 13 to fasten the ribs 27 of the rear trim 25 to the upper wall of the cross bar 13.

Then, the cross bar 13 and the roll bars 15 joined with the rear trim 25 are moved to a main convertible assembly line. On the main line, the mounting brackets 15a on the roll bars 15 are fastened to the rear floor portion 7 behind the seats 4 with the bolts 50. Further, the mounting pipes 15b attached to the roll bars 15 are fastened to the side panels 9 with the bolts 50, respectively. The mounting brackets 13a provided on both ends of the cross bar 13 are fastened to the cross bar mounting parts 17 provided on the side panels 9 with the bolts 50 inserted in the bolt insertion holes, respectively, thereby fixing the cross bar 13 to the side panels 9. Thus, the cross bar 13 and the roll bars 15 are firmly fixed to the bodywork frame 1.

Figure 10:
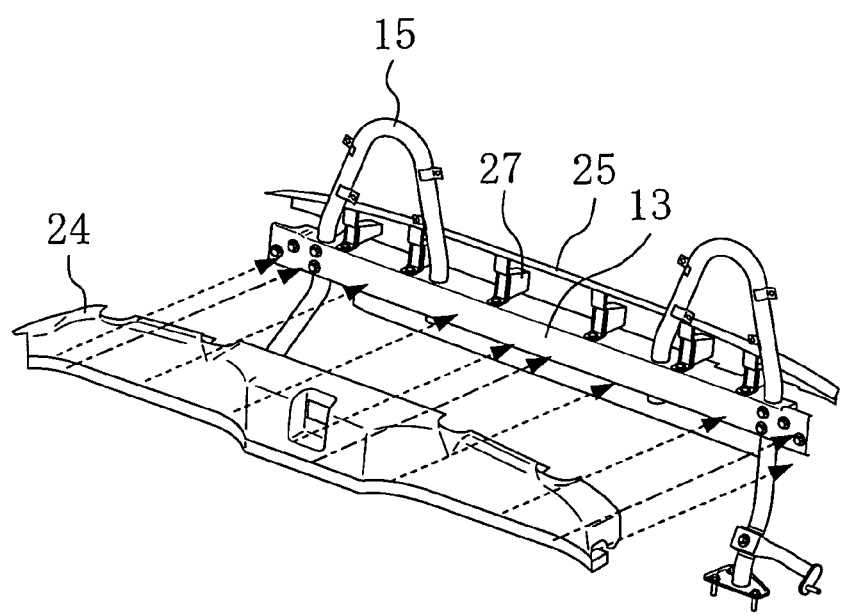
FIG. 10 is an exploded oblique view illustrating how to mount a front trim on the cross bar.

As shown in FIG. 10, when the positioning pin is formed on the inner wall of the upper front trim 24, the positioning pin is inserted in a positioning through hole formed in the front wall of the cross bar 13 to position the upper front trim 24 relative to the cross bar 13. Further, if the upper front trim 24 is provided with the engagement parts, protrusions formed at the rear ends thereof are inserted into the through holes formed in the front wall of the cross bar 13 to fix the engagement parts of the upper front trim 24 to the front wall of the cross bar 13.

Then, the engagement lugs formed on the upper front trim 24 and the rear trim 25 are engaged to each other to connect the upper front trim 24 and the rear trim 25.

Then, as shown in FIG. 8, each of the roll bars 15 is covered with the rear garnish 31a from behind and the clips 15c are fastened to the threaded holes with screws to fix the rear garnish 31a to the roll bar 15. The front garnish 31c and the rear garnish 31a are joined together by engaging the engagement lugs of the front and rear garnishes 31c and 31a.

As shown in FIG. 11, the lower trim 33 is then engaged to the upper front trim 24. Then, the lower trim 33 is fastened to the kick-up portion 5 with the fasteners 29 inserted in the fastener insertion holes 33a of the lower trim 33.

Effect of the Embodiment

According to the roll bar assembly 11 of the present embodiment, a plurality of ribs formed inside the resin trim 21 abut on the upper part of the cross bar 13. Thus, the roll bar assembly 11 which is capable of exerting the head impact protection function and easy to mount on the vehicle body is obtained.

Since the trim 21 is divided into the front and rear trims, the cross bar 13 and the roll bars 15 are covered from the front and the back thereof with the ribs 27 abutting on the upper wall of the cross bar 13. Thus, the trim 21 is mounted with greater ease and the rigidity of the trim 21 increases significantly.

Further, since the cross bar 13 is in the shape of a substantially rectangular pipe, mounting holes and the like can be formed with greater ease, allowing the front trim 23, rear trim 25 and ribs 27 to be fixed firmly to the cross bar 13.

Since the lower trim 33 of the front trim 23 is extended to the front floor portion 3 and fastened to the kick-up portion 5, the rigidity of the front trim 23 increases and the floor carpet is placed with better appearance.

The rear trim 25 is mounted on the cross bar 13 and the roll bars 15 on the sub line prior to the fixing of the cross bar 13 and the roll bars 15 to the vehicle body. Therefore, the mounting process becomes easy and production efficiency improves significantly. Further, since the ribs 27 of the rear trim 25 are fixed to the upper wall of the cross bar 13, the mounting accuracy and the rigidity of the mounted trim improve.

Other Embodiments

In addition to the above embodiment, the present invention may be configured as follows.

The front trim 23 in the above embodiment includes the upper front trim 24 and the lower trim 33 which are separately formed and then assembled. However, the upper front trim 24 and the lower trim 33 may be molded integrally. In this case, the parts count of the front trim 23 is reduced and the step of assembling the upper front trim 24 and the lower trim 33 is omitted. Further, a decrease in rigidity due to mounting failure is also prevented.

The garnish 31 in the above embodiment is made of the separated front trim 23 and rear trim 25 to allow easy mounting. However, the front garnish 31*c* may be molded integrally with the front trim 23 and the rear garnish 31*a* may be molded integrally with the rear trim 25 to reduce the parts count.

What is claimed is:

1. A roll bar assembly for convertibles comprising:
   a cross bar which is arranged below a beltline;
   roll bars which are connected to the cross bar to extend upward from the cross bar; and
   a resin-made trim which covers the cross bar, wherein
   the upper surface of part of the trim covering the cross bar is aligned with the beltline and
   a plurality of ribs are arranged in a space between the said part of the trim and the cross bar in a vehicle width direction, and
   the ribs are formed integrally with the trim to protrude downward.

2. A roll bar assembly according to claim 1, wherein lower ends of the ribs are supported on an upper part of the cross bar.

3. A roll bar assembly for convertibles comprising:
   a cross bar which is arranged below a beltline;
   roll bars which are connected to the cross bar to extend upward from the cross bar; and
   a resin-made trim which covers the cross bar, wherein
   the upper surface of part of the trim covering the cross bar is aligned with the beltline and
   a plurality of ribs are arranged in space between said part of the trim and the cross bar in a vehicle width direction,
   wherein the trim includes a front trim arranged at the front of the cross bar and a rear trim arranged behind the cross bar,
   lower ends of the ribs formed integrally with at least one of the front trim and the rear trim are supported on an upper part of the cross bar and
   the front trim and the rear trim are engaged to each other.

4. A roll bar assembly according to claim 3, wherein the rear trim is supported on a rear part of the cross bar.

5. A roll bar assembly according to claim 2, wherein the cross bar is in the shape of a substantially rectangular frame when viewed in cross section.

6. A roll bar assembly according to claim 3, wherein
   the front trim further includes a pair of extended portions which are located at both sides of a center tunnel bulging in the middle of a front floor portion in the vehicle width direction and extend toward the front floor portion, the extended portions being supported by a kick-up portion located behind the front floor portion to extend upward therefrom.

7. A method for mounting a roll bar assembly for convertibles comprising the steps of:
   preparing a cross bar to which roll bars are connected to protrude upward from the cross bar, a front trim to be arranged at the front of the cross bar and a rear trim to be arranged behind the cross bar and engaged to a rear part of the cross bar;
   arranging the rear him to be supported on an upper part of the cross bar;
   fastening the cross bar supporting the rear trim to a vehicle body; and
   engaging the front trim to a front part of the cross bar and the rear trim.

8. A roll bar assembly for convertibles comprising:
   a cross bar which is arranged below a beltline and has a cross section in the shape of a substantially rectangular frame;
   roll bars which are connected to the cross bar to protrude upward from the cross bar;
   a front trim which is arranged at the front of the cross bar; and
   a rear trim which is arranged behind the cross bar to be supported on a rear part of the cross bar, wherein
   the front trim and the rear trim are engaged to each other,
   part of the rear trim covering the cross bar is aligned with a beltline,
   a plurality of ribs are arranged in space between the said pan of the rear trim and the cross bar in the vehicle width direction, the ribs protruding downward to be supported on an upper part of the cross bar, and
   the front trim further includes a pair of extended portions which are located at both sides of a center tunnel bulging in the middle of a front floor portion in the vehicle width direction and extend toward the front floor portion, the extended portions being supported by a kick-up portion located behind the front floor portion to extend upward therefrom.

* * * * *

UNITED STATES PATENT AND TRADEMARK OFFICE
CERTIFICATE OF CORRECTION

PATENT NO. : 7,338,076 B2 Page 1 of 1
APPLICATION NO. : 11/058351
DATED : March 4, 2008
INVENTOR(S) : Katsuhiro Hamamoto et al.

It is certified that error appears in the above-identified patent and that said Letters Patent is hereby corrected as shown below:

On the Title Page Item (75) Inventors: lines 2-3, "Higashihiroshima" should read --Hiroshima--.

claim 8, column 8, line 55, "space between the said pan" should read --space between the said part--.

Signed and Sealed this

Tenth Day of November, 2009

David J. Kappos
*Director of the United States Patent and Trademark Office*